UNITED STATES PATENT OFFICE.

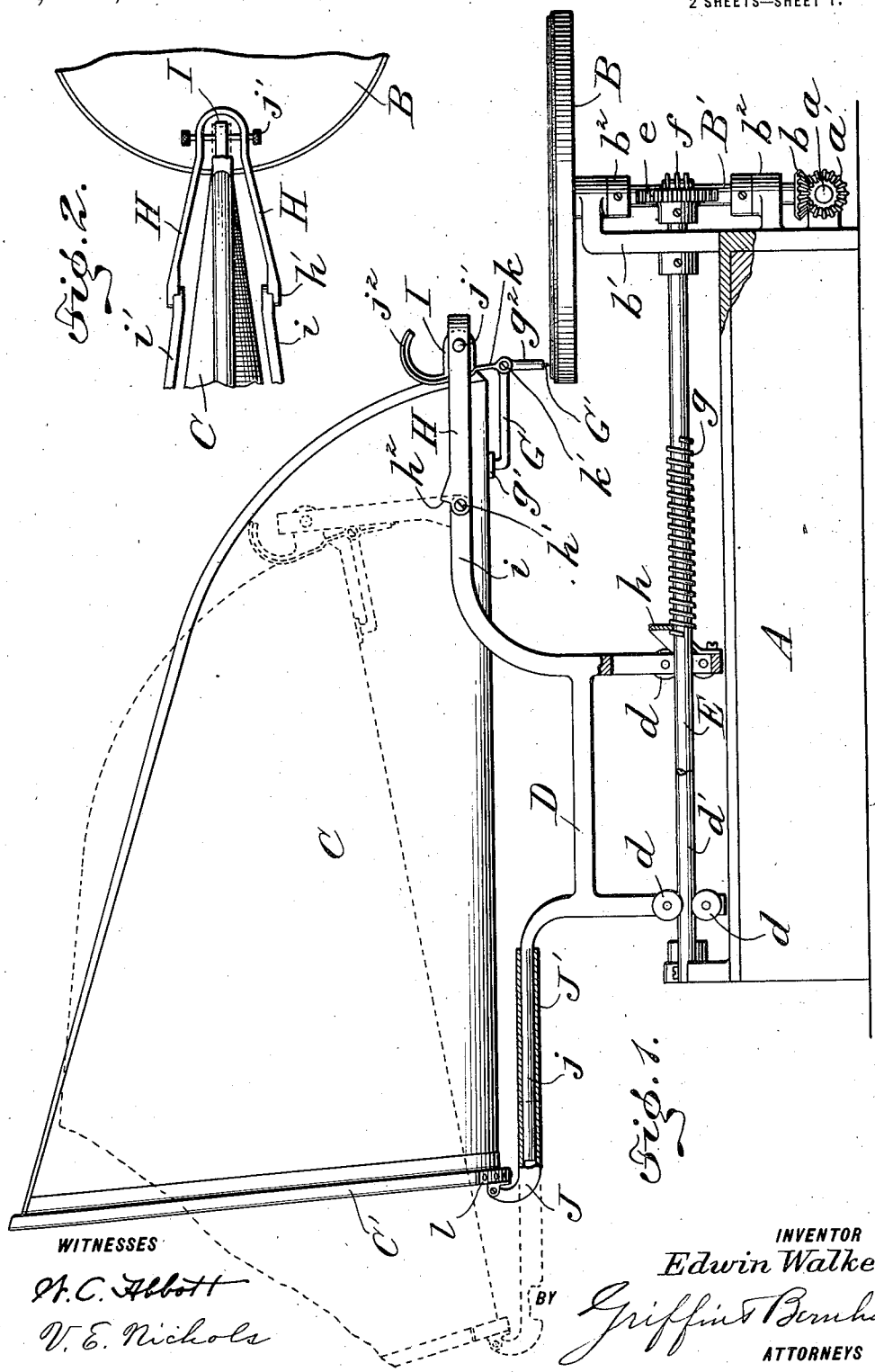

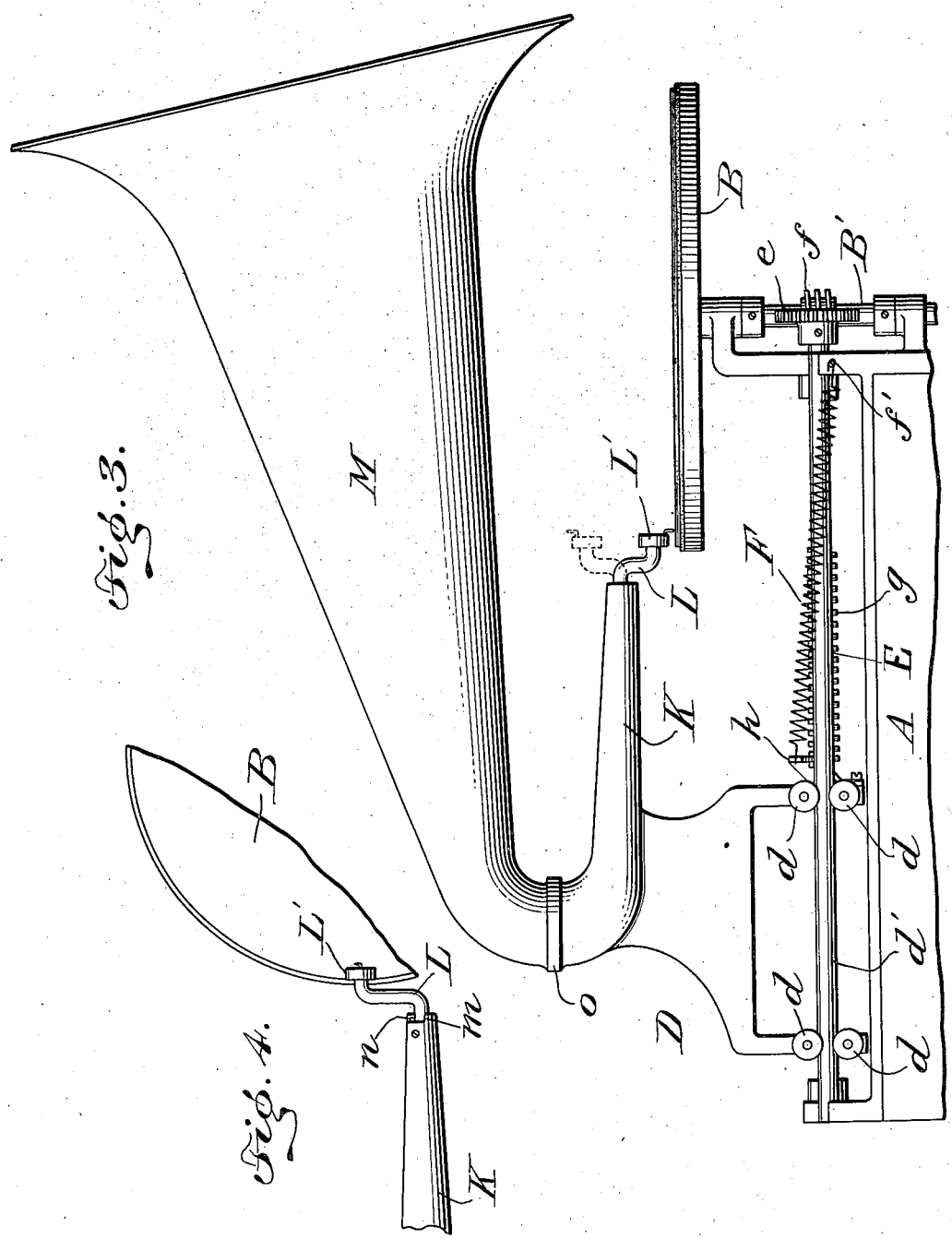

EDWIN WALKER, OF ERIE, PENNSYLVANIA.

PHONOGRAPH.

1,203,666.  Specification of Letters Patent.  Patented Nov. 7, 1916.

Application filed September 25, 1907, Serial No. 394,585. Renewed March 30, 1916. Serial No. 87,874.

*To all whom it may concern:*

Be it known that I, EDWIN WALKER, a citizen of the United States, residing in Erie, in the county of Erie and State of Pennsylvania, have invented certain new and useful Phonographs, of which the following is a specification.

This invention is a phonograph or gramophone, the broadly new feature of which consists of means for mechanically carrying the reproducer and horn and positively moving the same relative to or across a rotating record.

In the present invention the machine is equipped with a traveling carriage which is separate from a rotatable record-carrier and is operated independently thereof, said record-carrier rotating on a fixed axis, and said carriage being in a rectilinear path movable toward and from said record-carrier. On said sliding carriage there is mounted the reproducer and horn, the stylus of which is arranged to travel in the groove of the record, and with said carriage coöperates means for positively moving the same, whereby the reproducer and horn are moved in a positive manner and across a record on the aforesaid rotatable record-carrier.

According to one embodiment of the invention, the traveling carriage and the reproducer are equipped with means which permits the operator to readily lift the reproducer away from the record, and to support such reproducer firmly in place while adjusted in a non-working position. Said construction enables the operator to remove a record from the record-carrier, and replace it by another one, without danger of mutilating or scratching either record by the stylus of the reproducer. At the same time, the reproducer and horn are supported in position against accidental dislodgment, and can be easily and quickly replaced for operation after the fresh record is placed on the record-carrier.

In the accompanying drawings, I have illustrated one practical embodiment of the invention, but the construction shown therein is to be understood as illustrative only, and not as defining the limits of the invention.

Figure 1 is a side elevation of a phonograph embodying my invention, certain parts being shown in vertical section. Fig. 2 is a detail plan view showing a portion of the construction illustrated in Fig. 1. Fig. 3 is a side elevation of another style of gramophone embodying the present invention. Fig. 4 is a detail view of a part of the machine shown in Fig. 3.

The machine shown in Fig. 1 has a casing, A, of any suitable character which is adapted to contain the motor for operating the record carrier, B, and the reproducer, C.

The motor (not shown) is connected operatively with a horizontal shaft, $a$, which is provided with a bevel gear, $a'$, the latter meshing with a bevel gear, $b$, which is provided on the lower end of a vertical shaft, B', the latter supporting the record carrier B. The vertical shaft, B', is journaled in suitable bearings, $b^2$, of a bracket, $b'$, the latter being secured to the casing, A, or otherwise supported in a fixed position. The record carrier in the machine shown by this application is a flat table adapted for rotation in a horizontal plane, and on this table or carrier is adapted to be placed a disk like record of any known form.

The reproducer shown in Figs. 1 and 2 is a combined reproducer and horn of the type disclosed in the prior patents granted to me Nos. 805,544 and 805,600. Said reproducer and horn is mounted on a carriage, D, which carriage may be of any suitable or preferred construction. With said carriage is combined means for positively moving the same in a rectilinear path, and as the reproducer and horn is mounted on said carriage, it follows that the stylus is moved in a positive manner across the record while the latter is rotating with the carrier or table, B.

As shown, the carriage, D, is provided with rollers or wheels, $d$, adapted to ride on the track rods, $d'$, the latter being fixedly supported on the frame or casing, A, in a suitable way. These rods provide a horizontal track extending upwardly from the vertical plane of the shaft, B', for the carrier or table, although the track may be of any construction adapted to support the carriage, D, for movement in a substantially horizontal path.

The means for positively moving the carriage, D, is preferably operated by or driven from the shaft, B', and as herein shown, said carriage-driving means is embodied in the form of a horizontal screw shaft, E. Said shaft is arranged preferably in a horizontal position between the rods, $d'$, which form the track for the carriage, and said shaft is journaled in suitable bearings on the upper part of the frame or casing, A. The shaft is provided at one end with a worm gear, e, which meshes with a worm, f, the latter being provided on the vertical shaft, B'. The carriage-driving shaft is provided with a coarse male thread, g, with which engages a feed nut or traveler, h, the latter being preferably in the form of a lever pivoted on the carriage, D, and held in engagement with the thread, g, in any suitable way. As shown in Fig. 3, the feed lever or traveler, h, is held in position on the thread of the feed shaft by a coiled spring, F, one end of said spring being anchored, as at f', to a fixed part of the machine, whereby the spring holds the feed lever or traveler in engagement with the thread of the shaft, E, and at the same time said spring exerts a pulling effect on the carriage, D, so as to assist in drawing or moving the carriage, D, with the combined horn and reproducer toward the record carrier or table, B.

As shown, the carriage, D, is provided with two rearwardly extending arms, i, i', between which is adapted to lie the lower inner part of the combined horn and reproducer C. The carriage is provided, furthermore, with a stem or spindle, j, which extends from said carriage in an opposite direction to the arms, i, i', said stem or spindle occupying a horizontal position in a plane below the aforesaid arms.

The reproducer is equipped with a bell crank lever, G, one arm of which is connected operatively with the diaphragm or flexible material of the reproducer as at g'. The other arm of the bell crank is shown as having a stylus holder, $g^2$, in which is supported a stylus, G', of any suitable character.

H designates a bail which is fitted loosely around the lower rear part of the combined horn and reproducer. Said bail has its end portions connected pivotally to the arms, i, i' of the carriage by screws, h', and said pivoted ends of the bail are provided with the stop shoulder $h^2$, which are adapted to engage with the arms, i, i', when the bail and the reproducer are lifted to the inclined position shown by dotted lines in Fig. 1.

Within the bail, H, is a hanger, I, which hanger is supported in the bail near its closed end by a spindle or screw, j'. Said hanger has a depending member, k, on which is fulcrumed the bell crank, G, as at k', and the hanger is provided also with an upwardly extending finger piece, $j^2$, the same affording a convenient means for lifting the bail and the reproducer.

The bail, H, forms, practically, an extension or continuation of the carriage, D, and said bail, with the hanger and the bell crank, afford convenient means for supporting the inner part of the horn and reproducer upon the record on the table or carrier, B.

The open front part of the horn and reproducer, C, is reinforced by a mouth stay or rib, C', and on the underside of this stay is secured a bracket plate, 1. To this plate is pivoted a curved arm, J, the same being provided with a sleeve, J', that is fitted loosely on the stem, j, of the carriage. The arm, J, engages with the stem, j, so as to support the front end of the horn and reproducer, the latter being connected pivotally with said arm in order that the reproducer may be adjusted on a horizontal pivot to the inclined position indicated by dotted lines in Fig. 1. The sleeve, J', is free to slide endwise on the stem j, when the horn and reproducer are raised, whereby the horn is adapted to be lifted and moved forward, and to be supported firmly in such position by the bail, H, and the arm, J, thus fully exposing the carrier or table, B, for the purpose of placing a record thereon or removing a record therefrom. The described construction enables the records to be interchanged without the possibility of scratching, defacing or mutilating said records by contact with the stylus of the reproducer, for the reason that the horn and reproducer, and the stylus are supported in a position removed from the table or carrier, B, the bail, H, resting firmly upon the arms, i, i', of the carriage, all as shown by dotted lines.

The machine shown in Figs. 3 and 4 of the drawings is substantially the same as that heretofore described, except the form or reproducer and horn. As shown, the motor is incased within the frame or casing, A, said motor driving the vertical shaft, B', which is equipped with the carrier or table, B. Said vertical shaft has a worm, f, which meshes with a gear, e, on an end portion of the horizontal feed shaft, E, the latter being provided with the coarse thread, g. The carriage, D, is equipped with the rollers, d, adapted for engagement with the rods, d', forming the track, and said carriage is provided with the feed lever, h, the latter being adapted for engagement with the coarse screw, g, with which it is kept in such engagement by the spring, F.

The carriage, D, is provided with a hollow arm, K, the inner end of which is provided with a notch, m. In said hollow arm is journaled a hollow cranked member, L, the latter being provided with a reproducer, L', of any suitable construction. The member, L, is free to turn in the hollow arm, K, and the rotary motion of this member is limited by a stop, n, the latter working in the notch, m, of said arm, K. The horn, M, is of any suitable construction, and it is connected with the arm, K. If desired, the horn, M, and the arm, K, may be fixed with relation to each other, but as shown, the horn has a swiveled connection at o with the inner end of the arm, K, whereby the horn may be turned to any desired position with relation to the arm and the record of the table or carrier, B.

From the foregoing description taken in connection with the drawing, it will be observed that I have provided a carriage adapted to move in a rectilinear path, and to support a horn and reproducer in coöperative relation to a record adapted to be placed on a rotary carrier or table. Said table is positively rotated and the carriage is positively moved simultaneously, whereby the reproducer is given a traveling motion with respect to the rotary record.

Having thus fully described the invention, what I claim as new, and desire to secure by Letters Patent is:

1. In a phonograph, the combination with a record carrier, of a traveling carriage movable in a path radially with respect to the record carrier, a reproducing trumpet secured to said carriage and having a stylus positioned for contact with a record on said record carrier the weight of said trumpet being jointly supported by the carriage and the stylus, and means for slidably and pivotally securing the trumpet to said carriage, whereby the trumpet may be moved forwardly on the slidable connection and tilted upwardly on the pivotable connection to assume a position free from the record carrier.

2. In a phonograph, the combination with a rotatable record carrier, of a traveling carriage, impelling means for imparting movement to said carriage simultaneously with the rotation of the record carrier, said carriage being operated at less speed than the record carrier and being movable in a path radially to said record carrier, a reproducing trumpet the weight of which is imposed jointly upon said traveling carriage and upon a stylus coöperating with the reproducing trumpet, and means for slidably and pivotally connecting said trumpet to said carriage.

3. In a phonograph, a traveling carriage, a bail pivoted thereto, and a trumpet pivoted to the carriage and to the bail for the purpose of properly positioning the trumpet in operative relation to a disk or record.

4. In a phonograph, a traveling carriage, a bail pivoted thereto, and a combined trumpet and reproducer pivoted to the carriage and to the bail for the purpose of properly positioning the reproducer and trumpet in operative relation to a disk or record, said bail being adapted to be swung on its pivotal axis for tilting the trumpet, whereby the reproducer is removed from its operative position relative to the disk or record.

5. In a phonograph, a traveling carriage, a reproducer and trumpet pivotally and slidably connected to said carriage, and a bail pivoted to the carriage and connected to the trumpet and reproducer for supporting the latter in a raised position.

6. In a phonograph, a traveling carriage, a bail pivoted thereto, a trumpet and reproducer lying in the bail, and a member connected to said reproducer and to the bail for supporting the trumpet on the bail.

7. In a phonograph, the combination with a record carrier, and a traveling carriage, of a trumpet the weight of which is jointly imposed upon the carriage and on a reproducer mounted on the trumpet and normally resting on a record positioned on the record carrier, the rear part of said trumpet overhanging said record carrier, means for pivotally connecting the forward part of said trumpet to the carriage, and a lifting member pivoted to the carriage and to the trumpet, said lifting member being operable to lift the trumpet on its pivotal connection with the carriage and to support the trumpet in said lifted position.

In testimony whereof I have signed my name to this specification in the presence of two subscribing witnesses.

EDWIN WALKER.

Witnesses:
 Jas. H. Griffin,
 H. I. Bernhard.